United States Patent
Kopanski et al.

(10) Patent No.: US 10,906,638 B2
(45) Date of Patent: Feb. 2, 2021

(54) HELICOPTER TAIL ROTOR BLADES AND BLADE ASSEMBLIES

(71) Applicant: Sikorsky Aircraft Corporation, Stratford, CT (US)

(72) Inventors: Krzysztof Kopanski, Trumbull, CT (US); Daniel A. Griffiths, Woodbridge, CT (US); Joshua A. Breon, Lafayette, IN (US); Jonathan K. Wong, Trumbull, CT (US); Benjamin Isabella, Hamden, CT (US); Michael Skylar Lawson, Derby, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 88 days.

(21) Appl. No.: 16/070,705

(22) PCT Filed: Jan. 25, 2017

(86) PCT No.: PCT/US2017/014916
§ 371 (c)(1),
(2) Date: Jul. 17, 2018

(87) PCT Pub. No.: WO2017/172000
PCT Pub. Date: Oct. 5, 2017

(65) Prior Publication Data
US 2019/0055012 A1      Feb. 21, 2019

Related U.S. Application Data

(60) Provisional application No. 62/288,998, filed on Jan. 29, 2016.

(51) Int. Cl.
*B64C 27/473*     (2006.01)
*B64C 27/467*     (2006.01)
*B64C 27/04*      (2006.01)

(52) U.S. Cl.
CPC .......... *B64C 27/473* (2013.01); *B64C 27/467* (2013.01); *B64C 27/04* (2013.01)

(58) Field of Classification Search
CPC .......... B64C 27/04; B64C 27/32; B64C 27/46; B64C 27/467; B64C 27/473; B64C 27/82; F01D 5/12
See application file for complete search history.

(56) References Cited

U.S. PATENT DOCUMENTS 3,637,321 A    1/1972   Nekrasov et al.
3,952,601 A    4/1976   Galli et al.
(Continued)

OTHER PUBLICATIONS

'VR7 Datasheet', Sep. 2013, [online], [retrieved on Dec. 13, 2019]. Retrieved from: UIUC Applied Aerodynamics Group (Year: 2013).*

(Continued)

*Primary Examiner* — Courtney D Heinle
*Assistant Examiner* — Elton K Wong
(74) *Attorney, Agent, or Firm* — Foley & Lardner LLP

(57) ABSTRACT

A tail rotor blade for a helicopter includes a blade body defining a longitudinally extending spar cavity, a leading edge forward of the spar cavity, and a trailing edge aft of the spar cavity. Upper and lower airfoil surfaces extend from the leading edge to the trailing edge on opposite sides of the spar cavity. The upper and lower airfoil surfaces define between one another a constant airfoil segment and transition airfoil segments disposed longitudinally adjacent to the constant airfoil segment on inboard and outboard sides of the constant airfoil segment.

11 Claims, 4 Drawing Sheets

(56) References Cited

U.S. PATENT DOCUMENTS

| | | | |
|---|---|---|---|
| 3,967,996 A | | 7/1976 | Kamov et al. |
| 4,022,546 A | | 5/1977 | Drees et al. |
| 5,137,427 A | * | 8/1992 | Shenoy ................. B64C 27/463 |
| | | | 416/223 R |
| 6,497,385 B1 | | 12/2002 | Wachspress et al. |
| 6,929,215 B2 | | 8/2005 | Arlton |
| 7,252,479 B2 | | 8/2007 | Bagai et al. |
| 7,547,193 B2 | | 6/2009 | Moffitt et al. |
| 8,056,851 B2 | | 11/2011 | Brocklehurst et al. |
| 8,210,818 B2 | | 7/2012 | Brockhurst et al. |
| 2007/0110582 A1 | * | 5/2007 | Bagai .................... B64C 27/467 |
| | | | 416/223 R |
| 2008/0157429 A1 | | 7/2008 | Callis et al. |
| 2011/0211968 A1 | * | 9/2011 | Simkulak ............... B64C 27/463 |
| | | | 416/226 |

OTHER PUBLICATIONS

'SSCA09 Datasheet', Sep. 2013, [online], [retrieved on Dec. 13, 2019]. Retrieved from: UIUC Applied Aerodynamics Group (Year: 2013).*

International Search Report issued in Application No. PCT/US2017/014916 dated Sep. 27, 2017, 3 pages.

Written Opinion issued in Application No. PCT/US2017/014916 dated Sep. 27, 2017, 5 pages.

* cited by examiner

HELICOPTER TAIL ROTOR BLADES AND BLADE ASSEMBLIES

CROSS REFERENCE TO RELATED APPLICATION

This application is a National Stage application of PCT/US2017/014916, filed Jan. 25, 2017, which claims priority to U.S. Provisional No. 62/288,998 filed Jan. 29, 2016. Both applications are incorporated by reference in their entirety herein.

BACKGROUND OF THE INVENTION

1. Field of the Invention

The present disclosure relates to helicopters, and more particularly to anti-torque systems for helicopters.

2. Description of Related Art

Helicopters commonly include a main rotor system operably connected to an engine and rotatable supported by an airframe. The engine provides mechanical rotation to the main rotor system such that main rotor blades of the main rotor system rotate about the helicopter airframe, thereby providing lift and forward thrust to the helicopter. As the main rotor blades rotate about the helicopter airframe, the main rotor system applies torque to the airframe that tends to rotate the airframe. In order to stabilize the airframe against the tendency to rotate in response to main rotor system rotation, helicopters generally include an anti-torque system that applies a counterforce to the airframe in opposition to the torque associated with rotation of the main rotor system. Such anti-torque systems typically include a tail rotor operably connected to the engine and rotatable for generating thrust with a force component in opposition the torque associated with rotation of the main rotor system. The tail rotor thrust is typically commensurate with the rotational speed of the tail rotor, pitch settings of respective tail rotor blades, and the ambient atmospheric conditions. Under certain atmospheric conditions, such as in high and/or hot conditions, thrust generated by the tail rotor within the tail rotor blade pitch adjustment range can be reduced, potentially reducing the performance capabilities of the helicopter.

Such conventional methods and systems have generally been considered satisfactory for their intended purpose. However, there is still a need in the art for improved blades and blade assemblies for helicopter tail rotors. The present disclosure provides a solution for this need.

SUMMARY OF THE INVENTION

A tail rotor blade for a helicopter includes a blade body defining a longitudinal spar cavity, a leading edge forward of the spar cavity, and a trailing edge aft of the spar cavity. Upper and lower airfoil surfaces extend from the leading edge to the trailing edge on opposite sides of the spar cavity. The upper and lower airfoil surfaces define between one another a constant airfoil segment and transition airfoil segments disposed longitudinally adjacent to the constant airfoil segment on inboard and outboard sides of the constant airfoil segment.

In certain embodiments, the constant airfoil segment can taper chordwise between a longitudinally inboard end and a longitudinally outboard end of the constant airfoil segment. The constant airfoil segment can define an asymmetric airfoil relative to a chord intersecting the leading and trailing edges of the blade body. The constant airfoil segment can define a VR7 airfoil profile. The constant airfoil section can longitudinally span about 30% of the length of the blade body.

In accordance with certain embodiments, the constant airfoil segment can be a first constant airfoil segment, and the blade body can include a second constant airfoil segment. The second constant airfoil segment can be disposed longitudinally outboard of the first constant airfoil segment. The second constant airfoil segment can be coupled to the first constant airfoil segment by the second transition airfoil segment. The second constant airfoil segment defines a SSCA09 airfoil profile along the longitudinal length of the blade. The second constant airfoil section can longitudinally span about 13% of the length of the blade body. A tip cap can be connected to a longitudinally outboard end of the second constant airfoil segment. A tip rip can be disposed within the tip cap and outboard of the second constant airfoil segment.

It is also contemplated that, in accordance with certain embodiments, the first transition airfoil segment can define an SU2013 airfoil profile along its longitudinal length. The SU2013 can be defined on an end of the first transition segment longitudinally opposite the constant airfoil segment. The first transition segment can taper longitudinally between an outboard chord length and an inboard chord length, the outboard chord length being greater than the inboard chord length. The first transition airfoil segment can longitudinally span about 10% of the longitudinal length of the blade body. The second transition airfoil segment can define an SSCA09 airfoil profile along its longitudinal length. The SSCA09 airfoil profile can be defined on an end of the second transition segment opposite the constant airfoil segment. The second transition segment can taper longitudinally between an inboard chord length and an outboard chord length, the inboard chord length being greater than the outboard chord length. The second transition airfoil segment can longitudinally span about 7% of the length of the blade body.

It is further contemplated that, in accordance with certain embodiments, the blade body can include a symmetrical airfoil segment. The symmetrical airfoil segment can be connected to the constant airfoil segment by the first transition airfoil segment. The symmetrical airfoil segment can define an airfoil profile that is symmetrical relative to a chord extending between the leading and trailing edges of the blade body. The symmetrical airfoil segment can have an increasing taper between a longitudinally inboard end and a longitudinally outboard end of the symmetrical airfoil segment. The symmetrical airfoil segment can define an SU2021 airfoil profile on the longitudinally inboard end, and an SU2013 airfoil profile on the longitudinally outboard end of the symmetrical airfoil segment. The symmetrical airfoil segment can span about 35% of the length of the blade body.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
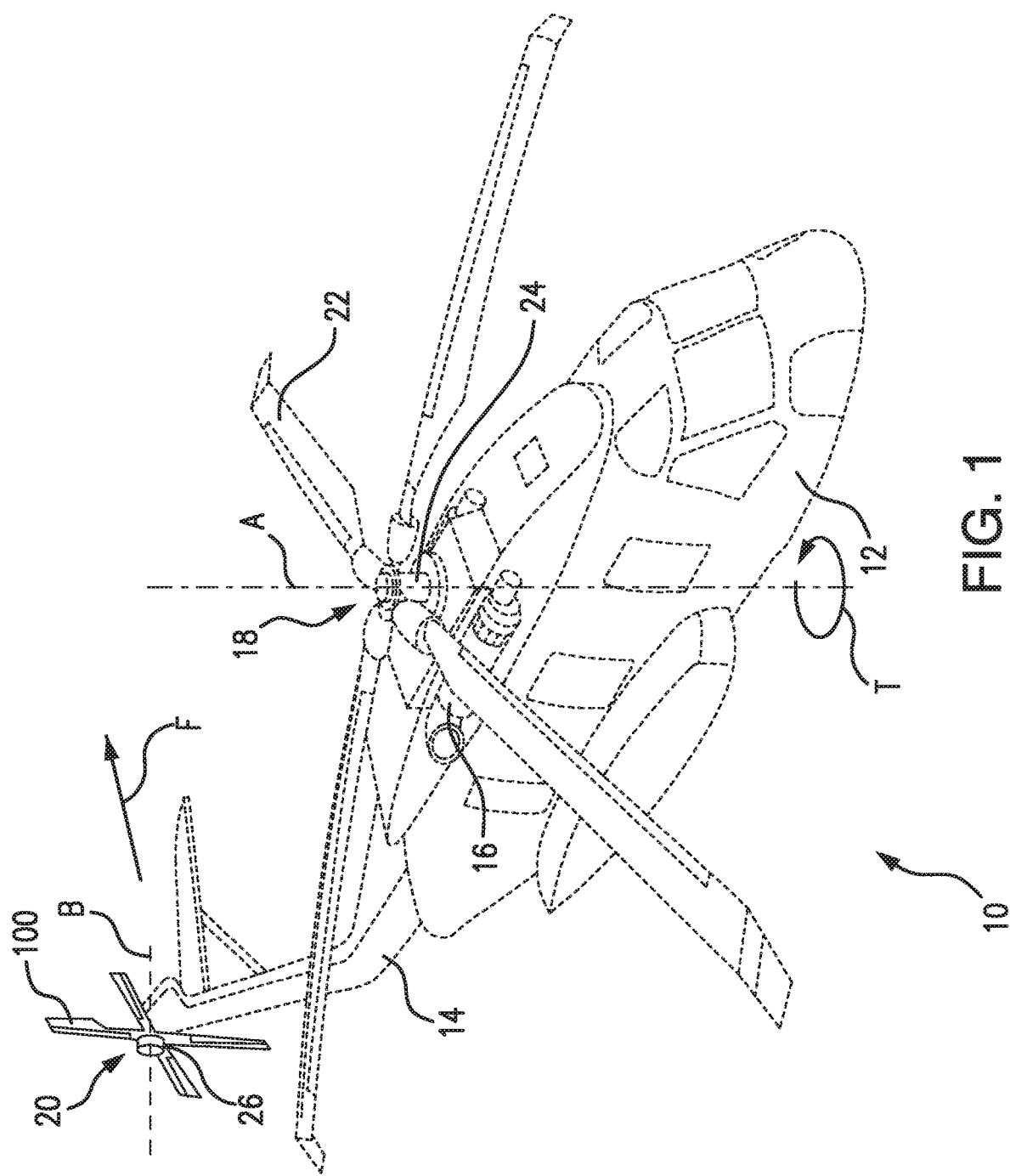
FIG. 1 is a perspective view of an view of an exemplary embodiment of a helicopter constructed in accordance with the present disclosure, showing a tail rotor assembly with a plurality of blades.

Reference will now be made to the drawings wherein like reference numerals identify similar structural features or aspects of the subject disclosure. For purposes of explanation and illustration, and not limitation, a partial view of an exemplary embodiment of a tail rotor blade assembly in accordance with the present is shown in FIG. 1 and is designated generally by reference character 100. Other embodiments of tail rotor blade assemblies, blade bodies for tail rotor assemblies, and helicopters with tail rotor systems having such tail rotor blades and tail rotor blade assemblies in accordance with the disclosure, or aspects thereof, are provided in FIGS. 2-7, as will be described. The systems and methods described herein can be used for restoring or improving tail rotor authority in high and/or hot operating environments, however the invention is not limited to helicopters or to rotorcraft generally.

Referring now FIG. 1, helicopter 10 is shown. Helicopter 10 includes an airframe 12 with a longitudinally extending tail 14. Airframe 12 carries one or more engines 16 and rotatably supports a main rotor system 18 and a tail rotor system 20. Main rotor system 18 includes a plurality of main rotor blades 22. Main rotor blades 22 are connected to a main rotor shaft 24 and are configured for rotation relative to airframe 12 about a main rotor axis A. Tail rotor system 20 includes one or more tail rotor assembly 100. Tail rotor assembly 100 is connected to a tail rotor shaft 26 and is configured for rotation relative to airframe 12 about a tail rotor axis B. Although a particular configuration of helicopter is illustrated in FIG. 1 and described herein, it is to be appreciated and understood that other helicopter and tail rotor system configurations can benefit from the present disclosure.

Tail rotor system 20 is configured to counteract torque applied to airframe 12 by rotation of main rotor system 18 about main rotor axis A. In this respect, the one or more tail rotor assembly 100 generates thrust having a force component F that opposes torque T applied to airframe 12 by rotation of main rotor system 18 about main rotor axis A. Tail rotor system 20 exerts force component F on longitudinally extending tail 14 with a magnitude that corresponds to the pitch of the one or more tail rotor assembly 100, rotational speed of tail rotor assembly 100, and atmospheric conditions in the immediate environment external to helicopter 10. As will be appreciated by those of skill in the art in view of the present disclosure, atmospheric conditions external to helicopter 10 can influence the amount of thrust generated by the one or more tail rotor assembly 100, potentially limiting tail rotor authority.

Helicopters, including helicopter 10, generally have a maximum altitude for forward flight that is greater than the maximum height at which hover can be maintained. This is because, for a given tail rotor blade setting and tail rotor speed, thrust is a function of air pressure. As air pressure decreases with increasing altitude, thrust drops, and helicopter 10 reaches an altitude where the thrust is no longer sufficient to offset the torque applied to the airframe by the main rotor system—at which point the airframe will begin to rotate—due to loss of tail rotor authority. Tail rotor assembly 100 is configured and adapted to provide increased thrust for a given tail rotor pitch and rotational speed, thereby generating additional thrust for air pressure and increasing the maximum hover altitude of helicopter 10.

Figure 2:
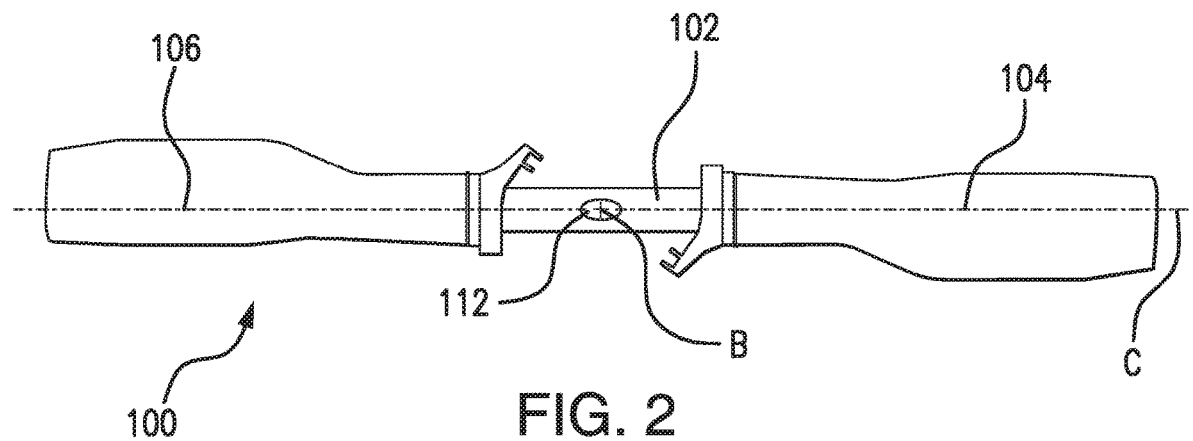
FIG. 2 is a plan view of the tail rotor assembly shown in FIG. 1, showing first and second blades fixed to opposed longitudinal ends of a spar.

With reference to FIG. 2, tail rotor assembly 100 is shown. Tail rotor assembly 100 includes a spar 102, a first blade body 104, and a second blade body 106. Spar 102 defines a longitudinal axis C and a drive aperture 112. Drive aperture 112 is centrally disposed along spar 102 and extends about rotation axis B. First blade body 104 couples to spar 102 on a side of drive aperture 112 opposite second blade body 106.

Figure 3:
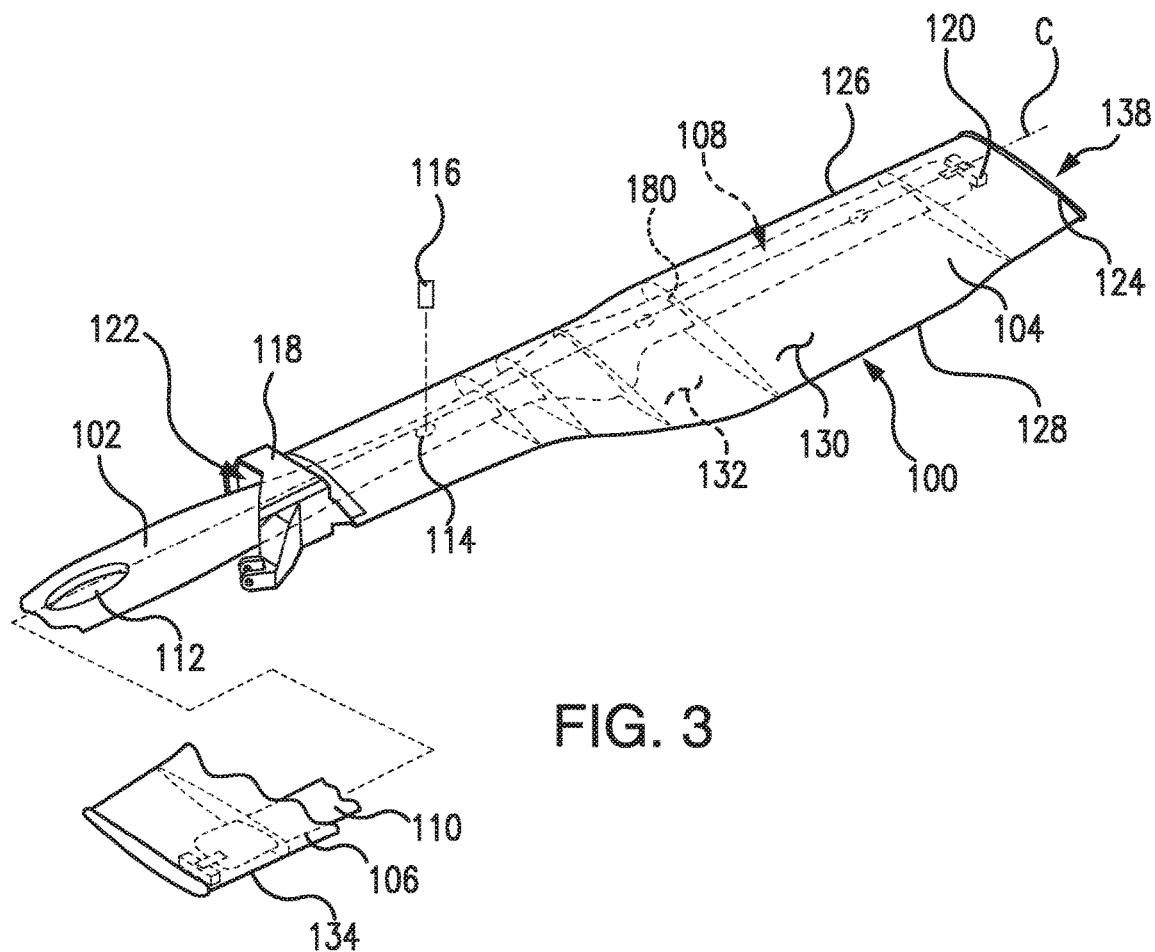
FIG. 3 is a perspective view of the tail rotor blade of the helicopter shown in showing the internal and external construction of the tail rotor assembly.

With reference to FIG. 3, first blade body 104 and second blade body 106 are shown. First blade body 104 defines within its interior a longitudinally extending spar cavity 122, a leading edge 126 forward of spar cavity 122, and a trailing edge 128 aft of spar cavity 122. First blade body 104 also defines an upper airfoil surface 130 that extends from leading edge 126 of first blade body 104 and trailing edge 126 of first blade body 104, and a lower airfoil surface 132 that extends from leading edge 126 to trailing edge 128 on a side of first blade body 104 opposite upper airfoil surface 130.

Spar cavity 122 extends longitudinally along first blade body 104 and within an interior defined between upper airfoil surface 130 and lower airfoil surface 132. Between leading edge 126 and trailing edge 128 the interior of first blade body 104 defines a plurality of airfoil profiles extending about spar cavity 122. The airfoil profiles defined by the interior of first blade body 104 change according to longitudinal position along the length of first blade body 104. In this respect, and as will be described further below, first blade body 104 has an airfoil definition with a longitudinal airfoil distribution where the widest chord of airfoil is disposed inboard of the outboard end of the blade body and within a constant airfoil segment. A tip cap 138 with a tip cap rib 124 is connected to an outboard end of first blade body 104. Second blade body 106 is similar to first blade body 104 with the difference that a leading edge 134 of second blade body 106 is disposed on a side of spar 102 opposite leading edge 126 of first blade body 104.

Spar 102 has a first end 108 and an opposed second 110. First end 108 of spar 102 is coupled to second end 110 of spar 102 such that they form a continuous structure (e.g., without a lateral seam) and define longitudinal axis C. Drive aperture 112 is configured and adapted to receive tail rotor shaft 26 (shown in FIG. 1) and receive mechanical rotation therethrough. First end 108 of spar 102 is seated within spar cavity 122 of first blade body 104. Second end 110 of spar 102 is seated within the spar cavity of second blade body 106. Fasteners 116 (only one shown for purposes of clarity)

seat within respective apertures 114 defined in spar 102, fixing first blade body 104 to first end 108 of spar 102. An adhesive or resin material may cooperate with fasteners 116 to fix first blade body 104 to spar 102. Although a single tail rotor assembly 100 is shown having a first blade body 104 and a second blade body 106, it is to be understood and appreciated that tail rotor systems may include two or more tail rotor assemblies, as suitable for a given application. In certain embodiments, tail rotor system may include two tail rotor assemblies angled relative to one another at a 90-degree or any other suitable angle.

A pitch horn 118 is fixed to spar 102 and first blade body 104 longitudinally along spar 102 between drive aperture 112 and first blade body 104. One or more balance weights 120 are connected to an outboard end of spar 102 for balancing tail rotor assembly 100 and reducing vibration during rotation. Second end 110 of spar 102 is similar to first end 108 of spar 102. In embodiments, spar 102 and pitch horn 118 may be substantially identical to the flex beam assembly and pitch horn provided on tail rotor assemblies provided with S-70 or Black Hawk® helicopters, available from Sikorsky Aircraft Corporation of Stratford, Ct. This allows for the upgrading existing helicopters with the distributed airfoil definition of first blade body 104 and second blade body 106, as further described below, without the need to replace the control system or pitch rod assembly currently in place on such aircraft.

Figure 4:
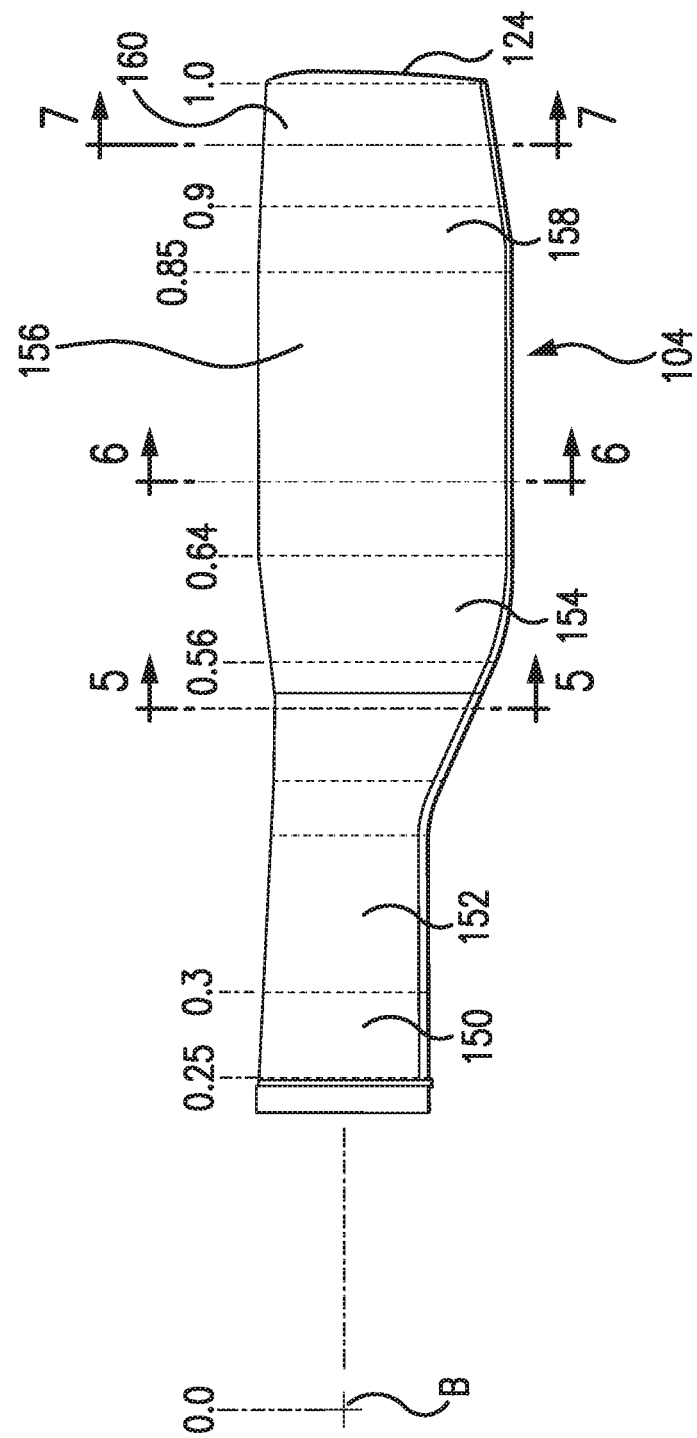
FIG. 4 is a spanwise plan view of a blade body of the tail rotor assembly of FIG. 1, showing the airfoil definition transitions along the longitudinal length of the blade body.

With reference to FIG. 4, the airfoil definition of first blade body 104 is shown. First blade body 104 has a longitudinally distributed airfoil definition including a plurality of airfoil segments defining different airfoil profiles. In the illustrated exemplary embodiment, first blade body 104 includes a root transition airfoil segment 150, a symmetrical airfoil segment 152, and an inboard transition airfoil segment 154. First blade body 104 also includes a mid-span constant airfoil segment 156, an outboard transition airfoil segment 158, and an outboard constant airfoil segment 160.

Root transition airfoil segment 150 is coupled to pitch horn 118 (shown in FIG. 3) on its inboard end, i.e. on a side of pitch horn 118 opposite drive aperture 112. Symmetrical airfoil segment 152 is connected to an outboard end of root transition airfoil segment 150. Inboard transition airfoil segment 154 is connected to an outboard end of symmetrical airfoil segment 152. Mid-span constant airfoil segment 156 is connected to an outboard end of inboard transition airfoil segment 154. Outboard transition airfoil segment 158 is connected to an outboard end of mid-span constant airfoil segment 156. Outboard constant airfoil segment 160 is connected to an outboard end of outboard transition airfoil segment 158. Tip cap 138 is connected to an outboard end of outboard constant airfoil segment 160.

Root transition airfoil segment 150 has a blended airfoil profile that transitions between first and second airfoil profiles. In this respect, on a spanwise inboard end adjacent to pitch horn 118 (shown in FIG. 2), root transition airfoil segment 150 defines an SU2023 airfoil profile. On a spanwise opposite, outboard end, mid-span constant airfoil segment 156 defines an SU2021 airfoil profile. Root transition airfoil segment 150 extends from the 0.25 normalized radial length position to about the 0.29 normalized radial length position of tail rotor assembly 100 (shown in FIG. 1) between the first and second profiles root transition, root transition airfoil segment 150 thereby forming about 5% of the spanwise length of tail rotor assembly 100.

Symmetrical airfoil segment 152 has a symmetrical airfoil profile (shown in FIG. 5) that tapers chordwise between a longitudinally inboard end and a longitudinally outboard end, the taper generally increasing toward the outboard end of symmetrical airfoil segment 152. On a span wise inboard end adjacent to root transition airfoil segment 150, symmetrical airfoil segment 152 defines an SU2021 airfoil profile. On a spanwise opposite, outboard end, symmetrical airfoil segment 152 defines an SU2013 airfoil profile. Therebetween, symmetrical airfoil segment 152 extends from the 0.3 normalized radial length position to about the 0.56 normalized radial length position of tail rotor assembly 100 (shown in FIG. 1), symmetrical airfoil segment 152 forming about 25% of the radial length of tail rotor assembly 100.

Inboard transition airfoil segment 154 has a blended airfoil profile that transitions between a symmetrical airfoil profile and to an asymmetrical airfoil profile. In this respect, on a spanwise inboard end adjacent to symmetrical airfoil segment 152, inboard transition airfoil segment 154 defines an SU2013 airfoil profile. On a longitudinally opposite, outboard end, inboard transition airfoil segment 154 defines a VR7 airfoil profile. Inboard transition airfoil segment 154 extends from the 0.56 normalized radial length location to about the 0.64 normalized radial length portion of tail rotor assembly 100 (shown in FIG. 1), inboard transition airfoil segment 154 forming about 10% of the radial length of tail rotor assembly 100.

Mid-span constant airfoil segment 156 has an asymmetrical airfoil profile that is constant along the segment spanwise length. In this respect, mid-span constant airfoil segment 156 defines a VR7 airfoil profile (shown in FIG. 6) continuously along the segment length that extends from about the 0.64 normalized radial length position to about the 0.85 normalized radial length position of tail rotor assembly 100 (shown in FIG. 1), mid-span constant airfoil segment 156 thereby forming about 20% of the radial length of tail rotor assembly 100. Between the inboard end and outboard end of mid-span constant airfoil segment 156, leading edge 126 of first blade body 104 jogs forward and trailing edge 128 of first blade body 104 jogs aft. Therebetween mid-span constant airfoil segment 156 defines a suitably sized airfoil surface that is offset far enough from tail rotor axis B and is appropriately shaped to generate relatively high tail rotor thrust, thereby counteracting the decrease in tail rotor thrust that some tail rotor blades can exhibit under high and hot operating conditions.

Outboard transition airfoil segment 158 has a blended airfoil profile that tapers chordwise between a longitudinally inboard end and a longitudinally outboard end. In this respect, on a spanwise inboard end adjacent to mid-span constant airfoil segment 156, outboard transition airfoil segment 158 defines a VR7 airfoil profile (shown in FIG. 6). On a spanwise opposite, outboard end, outboard transition airfoil segment 158 defines an SSCA09 airfoil profile (shown in FIG. 7). Outboard transition airfoil segment 158 extends from the 0.85 normalized radial length location to about the 0.90 normalized radial length position of tail rotor assembly 100 (shown in FIG. 1), outboard transition airfoil segment 158 forming about 5% of the radial length of tail rotor assembly 100.

Figure 6:
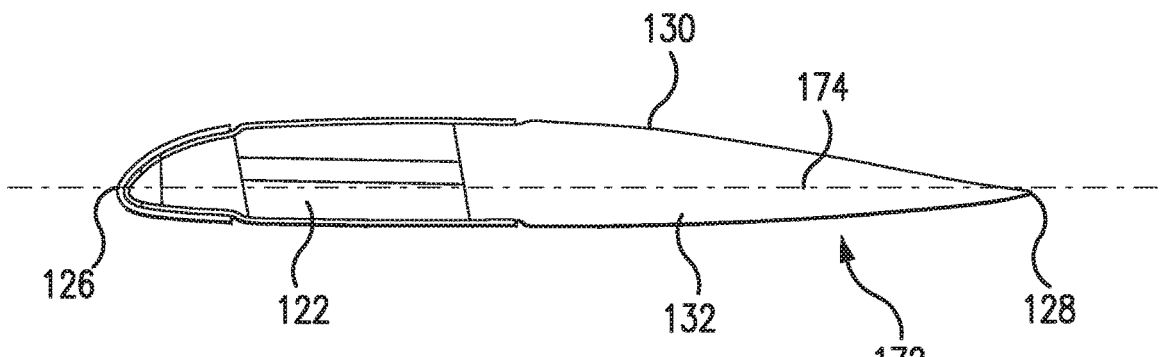

Outboard constant airfoil segment 160 has an asymmetrical airfoil profile that conforms to an SSCA09 airfoil profile (shown in FIG. 6). Outboard constant airfoil segment 160 tapers chordwise between a longitudinally inboard end and a longitudinally outboard end, a chord defined by the airfoil profile adjacent to outboard transition airfoil segment 158 having a length that is greater than a chord defined by the airfoil profile adjacent to tip cap 138. Outboard constant airfoil segment 160 extends from about the 0.90 normalized radial length position of tail rotor assembly 100 (shown in FIG. 1) to the end of first blade body 104, outboard constant airfoil segment 160 forming about 10% of the radial length of tail rotor assembly 100.

Figure 5:
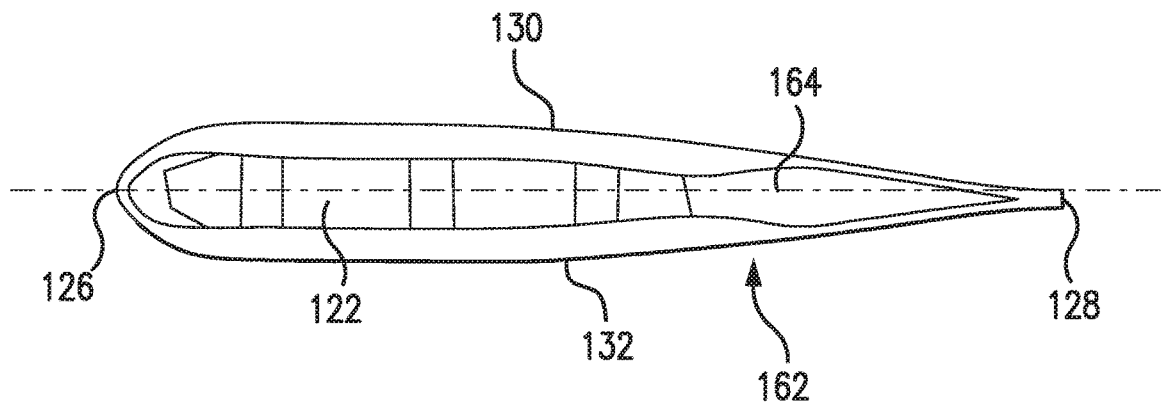
FIGS. 5-7 are chordwise cross-sectional views of the blade body of FIG. 5, showing the airfoil profile of the symmetrical airfoils segment, a first constant airfoil segment, and a second constant airfoil segment, respectively.
Figure 7:
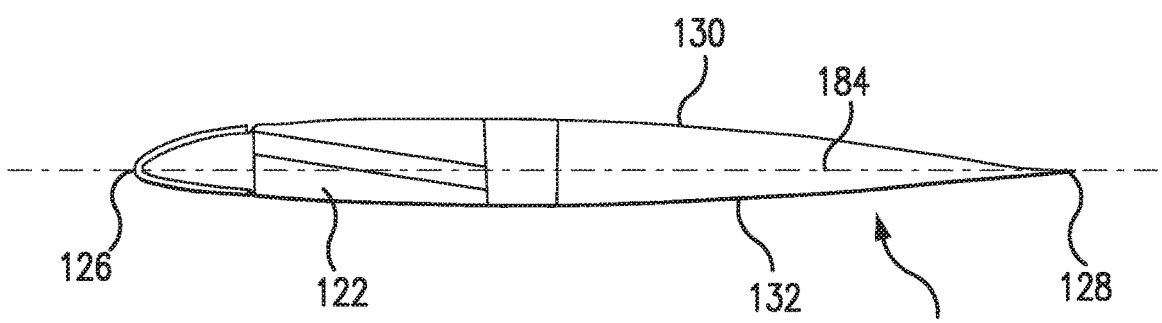

Referring now to FIGS. 5-7, airfoil profiles are shown. FIG. 5 shows a symmetrical airfoil profile 162 defined by symmetrical airfoil segment 152 (shown in FIG. 4). Relative to a chord 164 extending through leading edge 126 and trailing edge 128, the airfoil profile surrounding spar cavity 122 and bounded by upper airfoil surface 130 and lower airfoil surface 132 is symmetrical about chord 164. FIG. 6 shows an asymmetrical airfoil profile 172 defined by midspan constant airfoil segment 156 (shown in FIG. 4) that, in the illustrated exemplary embodiment, is a VR7 airfoil profile. Relative to a chord 174 extending through leading edge 126 and trailing edge 128, the VR7 airfoil profile surrounding spar cavity 122 and bounded by upper airfoil surface 130 and lower airfoil surface 132 is asymmetrical about chord 174. FIG. 7 shows an asymmetrical airfoil profile 182 defined by outboard constant airfoil segment 160 (shown in FIG. 4). Relative to a chord 184 extending through leading edge 126 and trailing edge 128, the airfoil profile surrounding spar cavity 122 and bounded by upper airfoil surface 130 and lower airfoil surface 132 is symmetrical about chord 184.

In embodiments, as a consequence of the airfoil definition illustrated in FIGS. 5-7 and the incorporation of spar 102 (shown in FIG. 2), tail rotor assembly 100 can have a first torsional response mode that is lower than the second flatwise mode. This allows for the tail rotor assembly 100 to be used with a pivot bearing with higher damping characteristics, such as may be realized using additional structure stiffeners 180 (shown in FIG. 2) coupled between spar 102 and first blade body 104 and distributed longitudinally along the length of tail rotor assembly 100.

The methods and systems of the present disclosure, as described above and shown in the drawings, provide for tail rotor blades with superior properties including relatively high tail rotor thrust at high altitude. In certain embodiments, the methods and systems of the present disclosure provide tail rotor blades and tail rotor blade assemblies that can be retrofit into a tail rotor control system and hub system of an existing helicopter. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A blade, comprising:
a blade body defining:
a longitudinal spar cavity;
a leading edge forward of the spar cavity;
a trailing edge aft of the spar cavity;
an upper airfoil surface extending from the leading edge to the trailing edge; and
a lower airfoil surface opposite the upper airfoil surface and extending from the leading edge to the trailing edge,
wherein the upper airfoil surface and the lower airfoil surface define therebetween a constant airfoil segment extending about the spar cavity and bounded longitudinally by a first transition airfoil segment and a second transition airfoil segment, chords of the transition airfoil segments being shorter than a chord of the constant airfoil segment; and
further comprising a symmetrical airfoil segment connected to the constant airfoil segment by the first transition airfoil segment, said symmetrical airfoil segment tapers longitudinally between an axially inboard end and an axially outboard end, wherein the taper increases toward the outboard end of said symmetrical airfoil segment, and the symmetrical airfoil segment is symmetrical relative to a chordwise plane intersecting the leading and trailing edges of the blade within the symmetrical airfoil segment,
wherein the symmetrical airfoil segment extends from a 0.3 normalized radial length position to a 0.56 normalized radial length position of a tail rotor assembly.

2. The blade as recited in claim 1, wherein the constant airfoil segment defines a VR7 airfoil profile.

3. The blade as recited in claim 1, wherein the first transition airfoil segment tapers longitudinally between an outboard chord length and an inboard chord length, the outboard chord length being greater than the inboard chord length.

4. The blade as recited in claim 1, wherein the second transition airfoil segment extending from the constant airfoil segment defines an SSCA09 airfoil profile along its longitudinal length.

5. The blade as recited in claim 4, wherein the SSCA09 airfoil profile is defined on an end of the second transition airfoil segment longitudinally opposite the constant airfoil segment.

6. The blade as in claim 1, wherein the second transition airfoil segment tapers longitudinally between a longitudinally inboard chord length and a longitudinally outboard chord length, the inboard chord length being greater than the outboard chord length.

7. The blade as recited in claim 1, wherein the constant airfoil segment is a first constant airfoil segment, and further including a second constant airfoil segment disposed longitudinally outboard of the first constant airfoil segment.

8. The blade as recited in claim 7, wherein the second constant airfoil segment is coupled to the first constant airfoil segment by the second transition airfoil segment.

9. The blade as recited in claim 7, wherein the second constant airfoil segment defines a SSCA09 airfoil profile along its longitudinal length.

10. The blade as recited in claim 7, wherein the second constant airfoil segment tapers longitudinally between an inboard chord length and an outboard chord length, the inboard chord length being greater than the outboard chord length.

11. The blade as recited in claim 7, further including a tip cap connected to a longitudinally outboard end of the second constant airfoil segment.

\* \* \* \* \*